United States Patent
Jayasuriya et al.

(10) Patent No.: US 8,998,262 B2
(45) Date of Patent: Apr. 7, 2015

(54) SEAT-BELT LOAD LIMITER

(71) Applicant: Ford Global Technologies, LLC, Dearborn, MI (US)

(72) Inventors: Mangala A. Jayasuriya, Bloomfield Hills, MI (US); Brian Robert Spahn, Plymouth, MI (US); James Chih Cheng, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 88 days.

(21) Appl. No.: 13/925,162

(22) Filed: Jun. 24, 2013

(65) Prior Publication Data
US 2014/0375109 A1    Dec. 25, 2014

(51) Int. Cl.
*B60R 22/28* (2006.01)
*B60R 22/34* (2006.01)
*G05G 7/00* (2006.01)

(52) U.S. Cl.
CPC .............. *B60R 22/3413* (2013.01); *G05G 7/00* (2013.01)

(58) Field of Classification Search
CPC ................ B60R 22/28; B60R 22/3413; B60R 2022/288; B60R 2022/287; G05G 7/00
USPC ........................................................ 280/805
See application file for complete search history.

(56) References Cited

U.S. PATENT DOCUMENTS

| | | | | |
|---|---|---|---|---|
| 6,047,914 A | * | 4/2000 | Sasaki | 242/379.1 |
| 7,240,924 B2 | * | 7/2007 | Kohlndorfer et al. | 280/807 |
| 7,290,730 B2 | * | 11/2007 | Nagata et al. | 242/374 |
| 8,123,154 B2 | | 2/2012 | Singer | |
| 8,220,735 B2 | * | 7/2012 | Wang et al. | 242/374 |
| 8,231,073 B2 | | 7/2012 | Lenning | |
| 2003/0132334 A1 | | 7/2003 | Koning et al. | |
| 2003/0201357 A1 | | 10/2003 | Koning et al. | |
| 2005/0139711 A1 | * | 6/2005 | Bell et al. | 242/379.1 |
| 2006/0022447 A1 | | 2/2006 | Kohlndorfer et al. | |
| 2006/0082127 A1 | * | 4/2006 | Clute | 280/807 |
| 2008/0017742 A1 | * | 1/2008 | Wigstrom et al. | 242/379.1 |

FOREIGN PATENT DOCUMENTS

EP            1031474        8/2000

* cited by examiner

*Primary Examiner* — Drew Brown
(74) *Attorney, Agent, or Firm* — LeClairRyan

(57) ABSTRACT

A device that limits a load of a seat belt includes various elements. For example, the device includes a seat-belt webbing and a shoulder anchor to which a portion of the webbing is secured. A button is attached to the webbing at a position that is a distance away from the portion secured to the shoulder anchor. The button is able to engage a lever, when the webbing is pulled out, to control energy absorption of the seat belt.

20 Claims, 5 Drawing Sheets

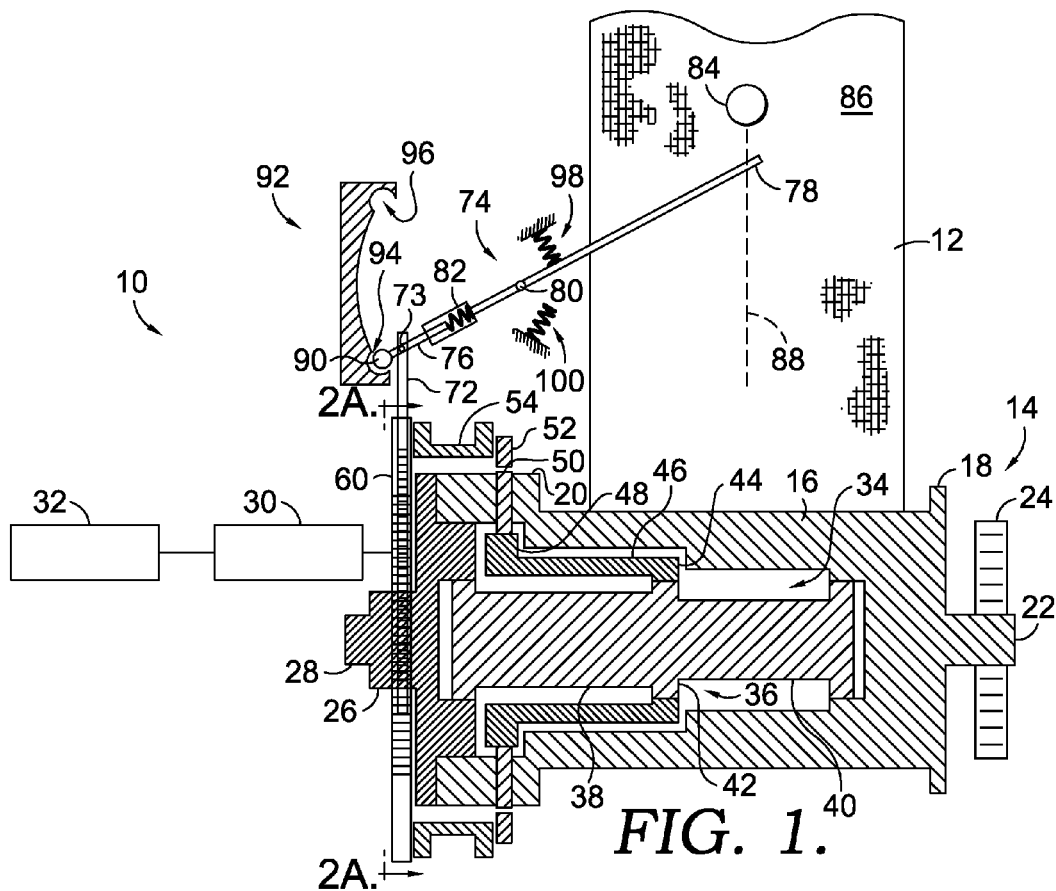
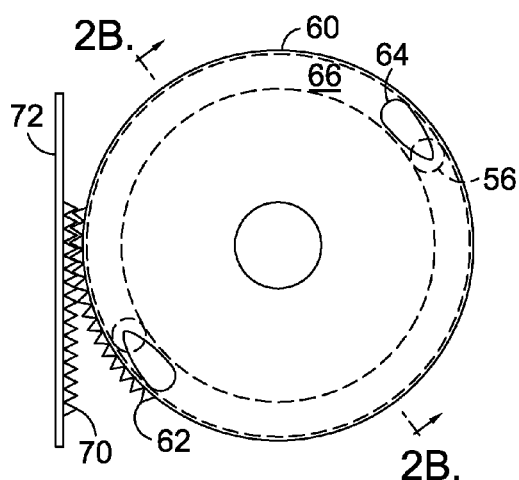 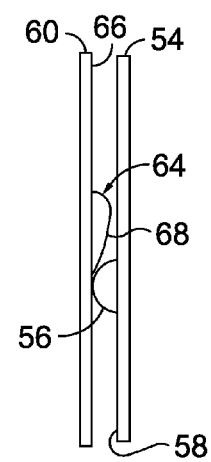
FIG. 1.
FIG. 2A.  FIG. 2B.

SEAT-BELT LOAD LIMITER

BACKGROUND

One countermeasure in occupant protection during a vehicular crash is the seat-belt restraint system. The force imparted on the chest, or other body part, of an occupant by the seat belt during a crash depends on various factors, such as the vehicle speed and deceleration, as well as occupant size. Safety technology associated with seat belts often includes pretensioners and load-limiting devices to manage energy appropriately in a timely manner to minimize the injury to the vehicle occupants.

Often vehicular seat-belt retractors include features that limit force applied against a seat occupant and that adapt belt tightening. These features can adjust based on various factors such as vehicle speed, occupant size, seating position, lapsed time, and the like during or prior to an impact. For example, many active devices and technologies used with seat belts rely on various sensors that provide instantaneous data such as vehicle speed, vehicle deceleration, occupant weight, occupant position, seat position among other parameters as designed to activate the seat belt safety system during a crash. Some systems have continuously changing mechanisms based on data during normal driving and pre-crash sensing so that the seat belt safety system is optimized to the driving condition of the vehicle as well as occupant.

The devices that control seat-belt functionality add cost and weight and are primarily used for the vehicle front-row occupants due to the proximity to stiffer structures of the vehicle such as the steering wheel, dashboard, glove box, instrument panel, etc. Energy absorption of the front-seat occupants during a crash is critical due to possibility of secondary impact of occupants on stiffer interior components.

Rear-seat occupants usually face the back of front seats, which can be designed to have a lesser risk of injury as compared with the stiffer interior components often positioned in the front of the vehicle. As such, although rear seat restraint systems might employ force-liming features that include near real-time data gathering sensors, other mechanism might also be used that are less complex.

SUMMARY

A high-level summary of various aspects of the invention is provided here to provide an overview of the disclosure and to introduce a selection of concepts further described in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, a device that limits a force imparted by a seat-belt apparatus. In one embodiment, the device includes a button attached to the webbing that travels in a path when the webbing is paid out and a lever engaged by the button traveling in the path. A position of the lever determines an orientation of a gear ring operatively coupled to the lever, and the orientation of the gear ring determines a status of a torsion-bar stiffening element. As such, a position of the button on the webbing dictates a position of the lever, and in turn, an orientation of the gear ring.

Another embodiment is directed to a control ring coupled adjacent the blocking ring and the gear ring coupled adjacent the control ring. The gear ring includes a protruding element, wherein the protruding element engages the control ring when the gear ring rotates to axially displace the control ring, and wherein axial displacement of the control ring axially displaces the blocking ring.

In a further embodiment, a seat-belt restraint system includes a seat-belt webbing and a shoulder anchor to which a first portion of the webbing is secured. The system also includes a spindle to which a second portion of the webbing is secured. A button is attached to the webbing at a position that is a distance away from the first portion, the button able to engage a lever when the webbing is pulled out to control energy absorption of the seat-belt apparatus.

BRIEF DESCRIPTION OF THE DRAWINGS

Illustrative embodiments of the present invention are described in detail below with reference to the attached figures, which are incorporated herein by reference, wherein:

FIG. 1 depicts a cross-sectional view of a seat-belt apparatus in accordance with an embodiment of the present invention;

FIG. 2A depicts a gear ring in accordance with an embodiment of the present invention;

FIG. 2B depicts a side view of the gear ring of FIG. 2A and a control ring in accordance with an embodiment of the present invention;

DETAILED DESCRIPTION

Figure 3:
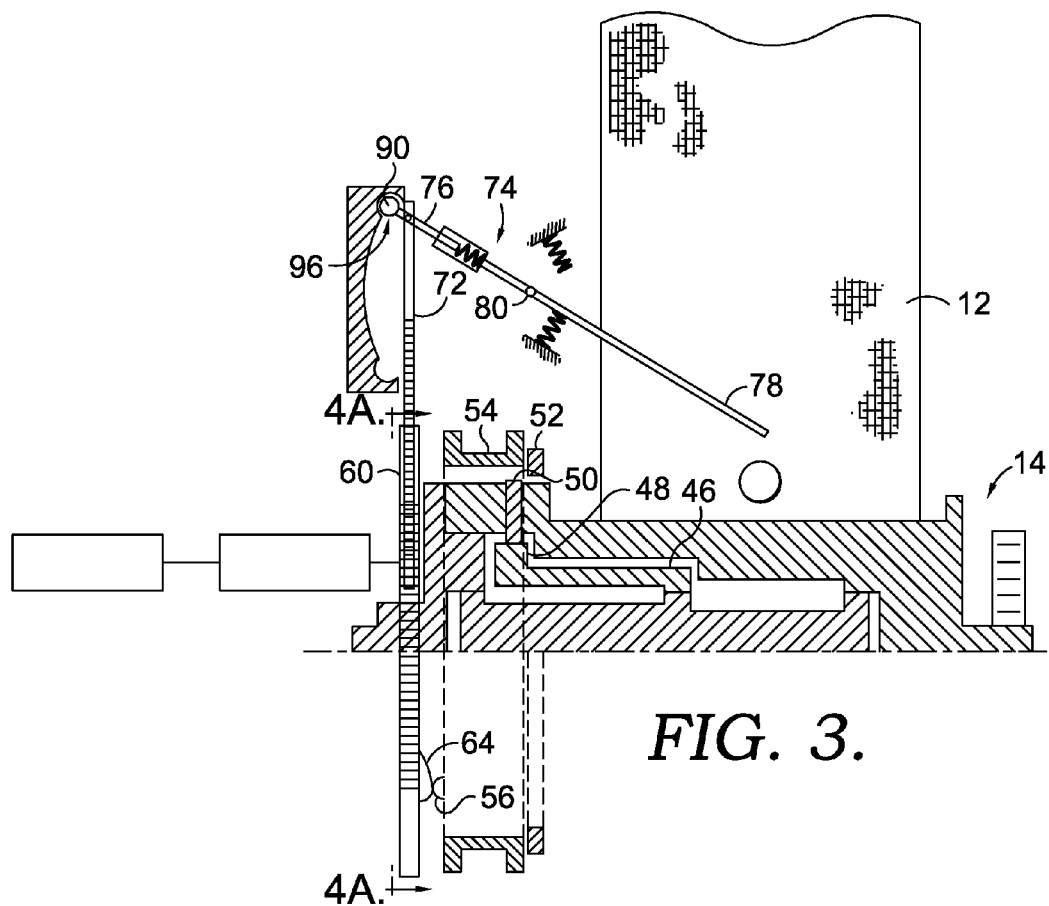
FIG. 3 depicts a cross-sectional view of a seat-belt apparatus in accordance with an embodiment of the present invention.

The subject matter of select embodiments of the present invention is described with specificity herein to meet statutory requirements. But the description itself is not intended to define what is regarded as the invention. Rather, the claims define the invention. The claimed subject matter might be embodied in other ways to include different elements or combinations of elements similar to the ones described in this document, in conjunction with other present or future technologies.

Referring to FIG. 1, a cross section of a portion of a seat-belt apparatus 10 is depicted. The seat-belt apparatus 10 includes a length of seat-belt webbing 12, which is at least partially wound about a spindle 14. The spindle 14 includes a spindle body 16, a first spindle flange 18, and a second spindle flange 20. The spindle flanges 18 and 20 bookend a region that receives the seat belt webbing 12. The spindle 14 includes a protrusion 22 or trunnion that is attached to a helical spring 24, which biases the spindle 14.

The seat-belt apparatus 10 further includes a spindle head 26, which is mounted to the spindle 14 so as to co-rotate with the spindle 14. The spindle head 26 also includes a protrusion 28 or trunnion for rotatable support. The spindle head 26 is coupled with a spindle lock 30, which locks the spindle head 26 relative to a vehicle chassis or frame 32 in response to an input. For example, the spindle lock 30 might lock the spindle head 26 in response to an inertial force or other detected potential accident situation. Locking the spindle head 26 prevents rotation of the spindle head 26 to impede paying out of the seat belt 12.

The spindle 14 defines a hollow central cavity 34 in which other components of the seat-belt apparatus 10 are housed. For example, a torsion bar 36 axially extends within the cavity 34. The torsion bar 36 is securely coupled in the cavity 34, such that the torsion bar 36 rotates together with the spindle 14 and the spindle head 26. Thus, locking the spindle head 26 also locks the torsion bar 36.

The torsion bar 36 includes a first region 38 and a second region 40. The first region 38 is stiffer than the second region 40. For example, the first region 38 might be made of a different material than the second region 40. Also, the first region 38 might have a larger diameter than the second region 40 as depicted in FIG. 1. Because the first region 38 is stiffer than the second region 40, the first region 28 provides higher energy absorption than the second region 40.

In addition, the torsion bar 36 includes a radially extending portion 42, which includes peripheral keyways or projections. The portion 42 engages a correspondingly configured end portion 44 of a torque tube 46, which surrounds the first region 38 of the torsion bar 36 and effectively inhibits operation of the second region 40 of the torsion bar 36. The torque tube 46 includes another end portion 48, which engages a radially moveable locking element 50. The locking element 50 extends through a radially extending bore positioned in the spindle flange 20. When the end portion 48 of the torque tube 46 engages the locking element 50, the torque tube 46 is prevented from rotating relative to the spindle 14.

Preventing the torque tube 46 from rotating relative to the spindle 14 engages the stiffer first region 38 of the tension bar 36 to a greater extent than the second region 40, such that the tension bar 36 imparts higher energy absorption. However, moving the locking element 50 radially outwardly disengages the locking element 50 from the torque tube 46 and permits the torque tube 46 to rotate relative to the spindle 14. Enabling the end 48 of the torque tube 46 to rotate relative to the spindle 14 removes the torque from the radially extending region 42 and reduces energy absorption of the tension bar 36 by activating the second region 40. In one embodiment, there may be two or a plurality of such locking elements 50.

The seat-belt apparatus 10 further includes a blocking ring 52, which circumscribes the spindle flange 20 and is spring biased toward the control ring 54. FIG. 1 depicts the blocking ring 52 aligned with an outermost portion of the locking element 50, such that the blocking ring 52 prevents the locking element 50 from moving radially outwardly and disengaging from the torque tube 46. However, the blocking ring 52 is movable axially relative to the spindle flange 20, such that moving the blocking ring 52 to the right (based on the perspective and view depicted in FIG. 1) allows the locking element 50 to move radially outwardly and disengage from the torque tube 46. For example, FIG. 3 depicts the blocking ring 52 axially shifted to the right (relative to its position in FIG. 1). The blocking ring 52 is also axially shiftable towards the gear ring 60 from a position that unlocks the locking element 50 to a position that locks the locking element 50. Locking elements 50 may be spring biased to move radially outward or alternatively moved out by the relative rotation of the end 48 of the torque tube 46 and spindle 14. These are merely examples of how stiffer or softer parts of the torque tube might be selected based on operations of the locking element 50, and any other known configurations might also be implemented.

The seat-belt apparatus 10 also includes a control ring 54 that circumscribes the flange 20 and the spindle head 26 and that is axially adjacent to the blocking ring 52. The control ring 54 is also depicted in FIGS. 2A and 2B. In one embodiment, the control ring 54 includes a protruding element 56 (FIGS. 2A and 2B) that extends outwardly from a side surface 58 of the control ring 54. The control ring 54 is slidably mounted on the flange 20 such that the control ring 54 can be shifted toward the blocking ring 52, such as when disengagement of the locking element 50 from the torque tube 46 is desired. The control ring 54 is also axially shiftable towards the gear ring 60.

In a further embodiment, the seat-belt apparatus includes a gear ring 60 positioned axially adjacent to the control ring 54. The gear ring 60 is also depicted in FIGS. 2A and 2B. The gear ring 60 is securely coupled to the spindle head 26, such that the gear ring 60 rotates relative to the spindle head 26 but does not axially shift relative to the spindle head 26. As depicted in FIG. 1, the control ring 54 is "sandwiched" between the blocking ring 52 and the gear ring 60. The control ring 54 may be axially spring biased towards the gear ring 60. In addition, the gear ring 60 includes a protruding element 64, which extends outwardly from a side surface 66 of the gear ring. In one embodiment, the protruding element 64 includes a slanted surface 68. Both protruding elements 56 (of the control ring) and 64 (of the gear ring) are aligned with one another and are positioned between the control ring 54 and the gear ring 60 (FIG. 2B). As such, when the gear ring is rotated (clockwise in the depiction of FIG. 2A) the protruding elements 56 and 64 engage to push the control ring 54 away from the gear ring 60.

The gear ring 60 includes a plurality of teeth 62 (FIG. 2A), which engage a complimentary set of teeth 70 of a rack 72 (or other complimentary gear). The rack 72 is pivotably attached at one end to a lever 74. For example, a pivot element 73 (e.g., a pin) might extend through both the lever 74 and the rack 72. The lever 74 includes a first end 76, which is attached to the rack 72, and a second end 78. In addition, the lever 74 includes a pivot 80 positioned between the first end 76 and the second end 78, the pivot 80 providing a pivotably attachment relative to the seat-belt assembly 10. The pivot 80 might be attached to the seat belt retractor housing or mounting bracket. The lever 74 further includes a locking spring 82 positioned between the pivot 80 and the first end 76, the locking spring 82 biasing the first end 76 away from the pivot 80. In addition, springs 98 and 100 assist with supporting the lever 74 when pivoted to different positions.

In a further embodiment, the first end 76 includes a ball element 90, which engages a socket element 92 (a.k.a. a "toggle") positioned adjacently to the first end 76. The socket element 92 includes a first socket 94 and a second socket 96, which selectively engage the ball element 90 depending on a pivot position of the lever 74. For example, in FIG. 1, the first end 76 of the lever 74 is pivoted downward, such that the ball element 90 engages the first socket 94 as the locking spring 82 biases the ball element 90 towards the first socket 94. When the first end 76 is pivoted upward, a lip of the first socket 94 engages the ball element 90 to push the first end 76 toward the pivot 80 and retract the locking spring 82, thereby allowing the ball element 90 to move out of the first socket 94. After the ball element 90 is moved out of the first socket 94 and the first end 76 is pivoted upward, the ball element 90 contacts a lip of the second socket 96, which pushes the first end 76 towards the pivot 80. Thus the ball element 90 is allowed to fit into the second socket 96 as the lever 74 pivots and the locking spring 82 biases the ball element 90 into the second socket 96 (e.g., FIG. 3).

In a further embodiment, a button 84 is coupled to the seat-belt webbing 12, the button 84 protruding outward from a surface 86 of the webbing 12. When the seat-belt webbing 12 is either paid out from the spindle 14 or retracted by the spindle 14, the button 84 travels in a path depicted by line 88. In an embodiment of the present invention, the second end 78 of the lever 74 intersects the path 88 of the button 84. As such, when the webbing 12 is paid out by an amount that exceeds a threshold (FIG. 1), the button 84 engages the second end 78 of the lever 74, thereby causing the lever 74 to pivot around pivot element 80. For example, the lever 74 might be pivoted to engage the ball element 90 with the first socket 94 when the webbing 12 is paid out by an amount that exceeds a threshold. Likewise, when the webbing 12 is retracted from the position depicted in FIG. 1 to a length that is below a threshold, the button 84 engages the second end 78 to cause the lever 74 to pivot. For example, the lever 74 might be pivoted to engage the ball element 90 with the second socket 96 when the webbing 12 is retracted by a threshold amount.

Figure 4A:
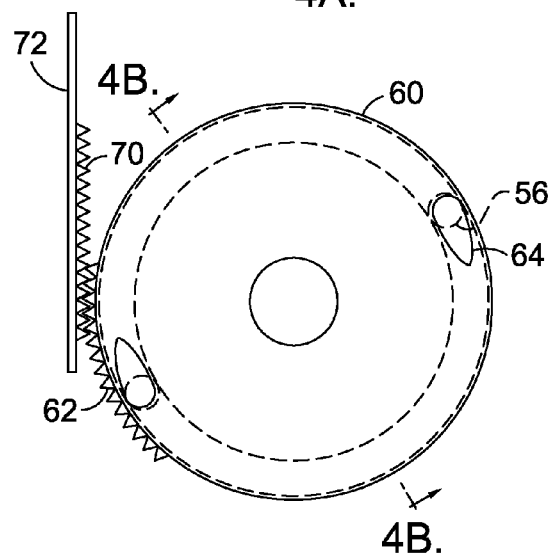
FIG. 4A depicts a gear ring in accordance with an embodiment of the present invention.
Figure 4B:
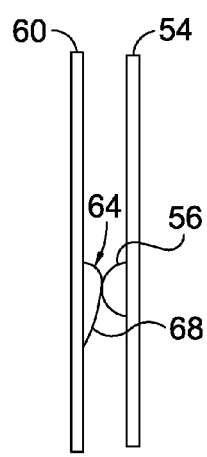
FIG. 4B depicts a side view of the gear ring of FIG. 4A and a control ring in accordance with an embodiment of the present invention.

FIGS. 1, 2A, and 2B depict an embodiment of the present invention in which the seat-belt webbing 12 has been paid out beyond a threshold amount, such that the button 84 has moved the lever 74 to a position in which the first end 76 engages the first socket 94. FIGS. 3, 4A, and 4B depict another embodiment of the present invention that is similar to FIGS. 1, 2A, and 2B and in which the seat-belt webbing 12 has been retracted by a threshold amount, such that the lever 74 is in a position in which the first end 76 engages the second socket 96. In FIG. 3, a bottom portion of the spindle 14 has been cut away to show the engagement between protrusions 64 and 56.

Figure 7:
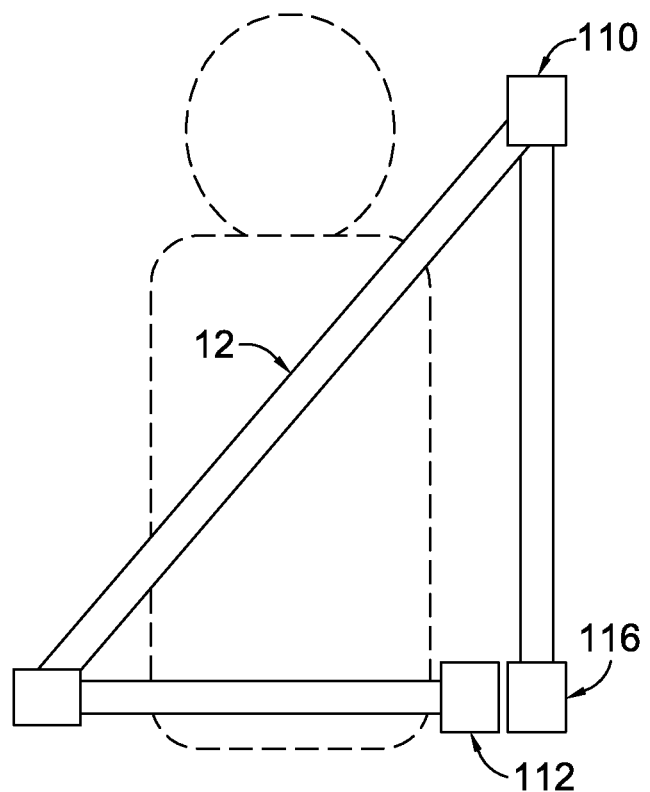
FIG. 7 depicts a schematic diagram of an arrangement of a seat-belt restraint system in accordance with an embodiment of the present invention.

In an embodiment of the present invention, the threshold is determined based on where the button is located on the webbing 12 and is a function of the length of the webbing between a shoulder anchor or ring 110 of the belt and a hip-region anchor 112, which might be anchored to a floor of the vehicle. A schematic diagram showing such elements is depicted in FIG. 7. Typically, when the seat belt is in a retracted state, such as when the seat belt is not being used by an occupant, the amount of webbing outside the belt retractor spindle depends on how the seat belt 12 is routed through the shoulder ring 110 and vehicle-floor anchor 112. The amount of seat belt webbing 12 that is paid out from the spindle, when the seat belt is being used, depends on the size of the occupant. For example, the belt length from a shoulder region to a hip region (near floor anchor point) for a seated $5^{th}$ percentile ATD dummy is generally less than 900 millimeters, while for $50^{th}$ percentile and larger ATD dummies this distance is greater than 1070 mm. Therefore a difference in belt paying out distance of about 170 millimeters can be used to distinguish a smaller and larger occupant. In one embodiment, the button 84 is secured to the webbing 12 at a button position, such that the button position is on or very near the spindle 14 when a smaller occupant is belted (i.e., lever not flipped upward) and the button is further outside the spindle 14 when a larger occupant is belted (i.e., lever flipped).

Referring to FIGS. 1, 2A, 2B, 3, 4A, and 4B, an operation of an embodiment of the present invention will now be described. FIG. 3 represents a status of the seat-belt apparatus 10 in which the seat-belt webbing 12 has been paid out by an amount below a threshold. For example, the seat-belt apparatus might be in a non-use state. Alternatively, the seat-belt apparatus might be in use by a seat occupant having a size that does not require the seat-belt webbing to be paid out by an amount that exceeds the threshold. According to FIG. 3, because the seat-belt webbing 12 has not been paid out by an amount exceeding a threshold, the button 84 has not pushed the second end 78 of the lever 74 upward, and the ball element 90 of the first end 76 of the lever 74 remains engaged with the second socket 96.

When the lever 74 is positioned as depicted in FIG. 3, the rack 72 is pulled to a raised orientation (relative to the position in FIGS. 1, 2A, and 2B). Positioning the rack 72 upward causes the rack teeth 70 to engage the gear-ring teeth 62, thereby rotating the gear ring 60 clockwise relative to the control ring 54 as depicted by the view of FIG. 4A. When the rack 72 holds the gear ring 60 in the position depicted by FIG. 4A, the gear-ring protrusion 64 is slid between the gear ring 60 and the control-ring protrusion 56, thereby biasing the control ring 54 away from the gear ring 60. In one embodiment, the slanted surface 68 assists with sliding the gear-ring protrusion 64 between the gear ring 60 and the control-ring protrusion 56.

In an embodiment, when the control ring 54 is axially shifted by the gear ring 60 (i.e., by axial alignment of the protrusions 64 and 56), the control ring 54 displaces the blocking ring 52. As such, the blocking ring 52 is not in position to impede the locking element 50 from moving radially outwardly and disengaging from the torque tube 46. That is, the locking element 50 is allowed to move outward into a space between the locking element 50 and the control ring 54. As previously described, disengaging the locking element 50 from the torque tube 46 permits the end 48 of the torque tube 46 to rotate relative to the spindle 14. Enabling the end 48 of the torque tube 46 to rotate relative to the spindle 14 removes the torque from the radially extending region 42 makes the second region 40 available for reduced energy absorption if needed. As such, when the webbing 12 is paid out by an amount that does not exceed a threshold, the seat-belt apparatus 10 is configured for reduced energy absorption.

In another embodiment, the seat-belt webbing 12 is paid out from the spindle 14 by an amount that exceeds a threshold, and FIG. 1 illustrates the seat-belt webbing 12 paid out by an amount above a threshold. For example, the seat-belt webbing 12 might be pulled from the position depicted in FIG. 3 to the position depicted in FIG. 1. According to FIG. 1, because the seat-belt webbing 12 has been paid out by an amount exceeding a threshold, the button 84 has pushed the second end 78 of the lever 74 upward, and the ball element 90 of the first end 76 of the lever 74 slips out of the second socket 96 and engages the first socket 94.

When the lever 74 is positioned as depicted in FIG. 1, the rack 72 is pushed to a lowered orientation (relative to the position in FIGS. 3, 4A, and 4B). Positioning the rack 72 downward causes the rack teeth 70 to engage the gear-ring teeth 62, thereby rotating the gear ring 60 counterclockwise relative to the control ring 54 as depicted by the view of FIG. 2A. When the rack 72 holds the gear ring 60 in the position depicted by FIG. 2A, the gear-ring protrusion 64 is removed from between the gear ring 60 and the control-ring protrusion 56, thereby allowing the control ring 54, which is spring biased towards the gear ring 60, to slide axially toward the gear ring 60.

In an embodiment, when the control ring 54 is axially shifted toward the gear ring 60 (i.e., by disengaging the protrusions 64 and 56), the blocking ring 52 is allowed to shift to a position aligned with the locking element 50. As such, the blocking ring 52 is in position to impede the locking element 50 from moving radially outwardly and disengaging from the torque tube 46. As previously described, engaging the locking element 50 to the torque tube 46 impedes the torque tube 46 from rotating relative to the spindle 14. Preventing the torque tube 46 from rotating relative to the spindle 14 engages the stiffer first region 38 of the tension bar 36 to a greater extent than the second region 40, such that the tension bar 36 imparts higher energy absorption. As such, when the webbing 12 is paid out by an amount that exceeds a threshold, the seat-belt apparatus 10 is configured for increased energy absorption.

Figure 5:
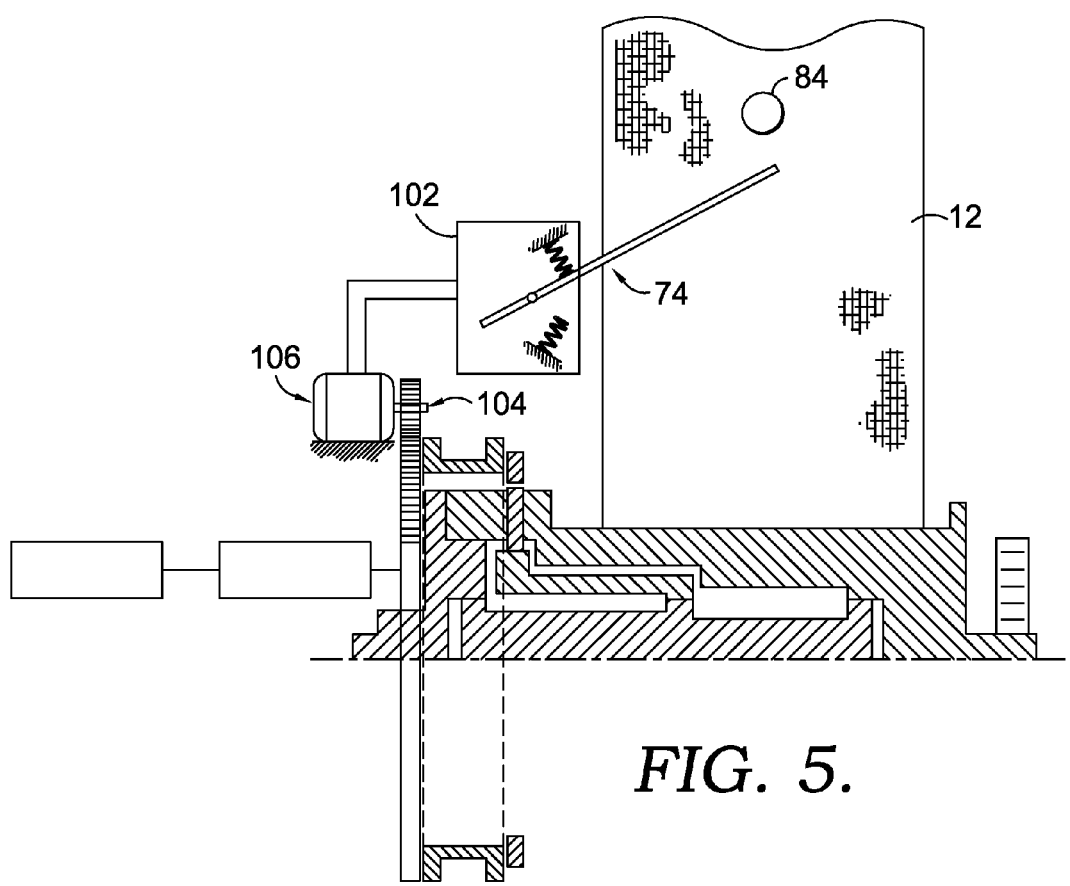
FIG. 5 depicts a cross-sectional view of a seat-belt apparatus in accordance with an embodiment of the present invention.
Figure 6:
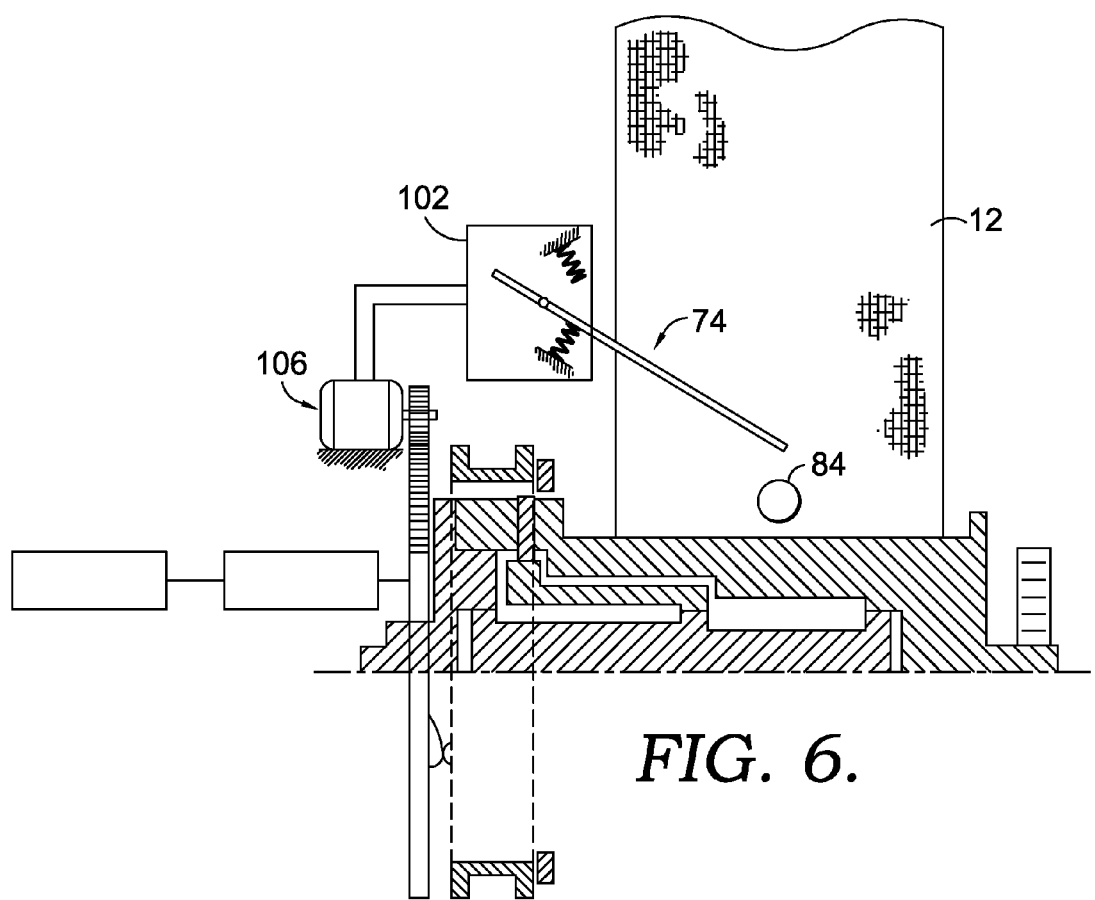
FIG. 6 depicts a cross-sectional view of a seat-belt apparatus in accordance with an embodiment of the present invention.

FIGS. 5 and 6 depict another embodiment of the present invention. In FIGS. 5 and 6, an electronic toggle switch 102 replaces the mechanical toggle switch depicted by FIGS. 1 and 3. In addition, a gear drive 104 and motor 106 replace the rack configuration depicted by FIGS. 1 and 3. As such, the electronic toggle switch 102 functions to switch a direction in which the motor 106 turns, based on a position of the lever 74. Similar to the embodiment described with respect to FIGS. 1 and 3, the position of the lever 74 is determined by whether an amount of the webbing 12 is paid out beyond a threshold, such that the button 84 engages the lever 74. FIG. 5 is similar to the FIG. 3 and shows how stiffer part of the torsion bar is active when a perceived heavy occupant is pulling the seat belt during a crash. That is, the occupant is perceived to be heavier based on the amount of webbing paid out. FIG. 6 is similar to the FIG. 3 and shows how softer part of torsion bar deforms with a lower load induced by a occupant that is perceived to be lighter based on the amount of webbing 12 paid out.

Many different arrangements of the various components depicted, as well as components not shown, are possible without departing from the scope of the claims below. Embodiments of our technology have been described with the intent to be illustrative rather than restrictive. Alternative embodiments will become apparent readers to of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. An apparatus for controlling a torsion bar, which limits force of seat-belt webbing paid out from a spindle, the apparatus comprising:
a button attached to the webbing that travels in a path when the webbing is paid out;
a lever engaged by the button traveling in the path; and
a gear ring operatively coupled to the lever, wherein engaging the lever by the button rotates the gear ring to disengage a torsion-bar stiffening element.

2. The apparatus of claim 1, wherein the button is attached to the webbing at a location that correlates to an average division between seat-occupant sizes.

3. The apparatus of claim 2, wherein the webbing is secured to a floor anchor near a hip region and extends through a shoulder ring to the spindle, and wherein the location of the button indicates when the webbing paid out between the hip region and the shoulder ring is about or below 900 millimeters.

4. The apparatus of claim 3, wherein the location of the button indicates when the webbing paid out between the hip region and the shoulder ring is about or above 1070 millimeters.

5. The apparatus of claim 1, wherein the lever is coupled to a rack having a first set of teeth, which engages a second set of teeth on the gear ring to rotate the gear ring.

6. The apparatus of claim 1, wherein the lever is coupled to an electronic switch, which controls a motor that rotates the gear ring.

7. The apparatus of claim 1, wherein the gear ring includes a protrusion that is positioned between the gear ring and a control ring, which is positioned and spring biased axially towards the gear ring.

8. The apparatus of claim 7, wherein the protrusion of the gear ring engages a control-ring protrusion to bias the control ring away from the gear ring.

9. The apparatus of claim 7, wherein the protrusion of the gear ring includes an angled surface for the engagement of the protrusion of the control ring.

10. An apparatus that controls a position of a blocking ring of a seat-belt force-controlling mechanism, the apparatus comprising:
a control ring coupled adjacent the blocking ring; and
a gear ring coupled adjacent the control ring, the gear ring including a protruding element, wherein the protruding element engages the control ring when the gear ring rotates to axially displace the control ring, and wherein axial displacement of the control ring axially displaces the blocking ring.

11. The apparatus of claim 10, wherein the control ring includes a control-ring protruding element, and wherein the protruding element of the gear ring axially aligns with the control-ring protruding element to displace the control ring.

12. The apparatus of claim 10 further comprising, a rack having a first set of teeth, wherein the first set of teeth engage the gear ring to rotate the gear ring.

13. The apparatus of claim 12 further comprising, a lever having a first end and a second end, wherein the first end is coupled to the rack, and wherein the lever pivots to cause the rack to move in a reciprocating manner to selectively rotate the gear ring in alternative directions.

14. The apparatus of claim 13 further comprising, a button coupled to a seat-belt webbing, wherein the button engages the second end of the lever to pivot the lever when the seat-belt webbing is paid out.

15. A seat-belt restraint system comprising:
a seat-belt webbing;
a spindle to which one end of the webbing is secured;
a floor anchor to which the other end of the webbing is secured;
a shoulder ring through which the webbing passes;
a button attached to the webbing; and
a lever that is engageable by the button when the webbing is pulled out to control energy absorption of the seat-belt apparatus.

16. The apparatus of claim 15, wherein the webbing is secured to a floor anchor near a hip region and extends through a shoulder ring to the spindle and wherein a location of the button indicates when the webbing paid out between the hip region and the shoulder ring is about or below 900 millimeters.

17. The apparatus of claim 16, wherein the location of the button indicates when the webbing paid out between the hip region and the shoulder ring is about or above 1070 millimeters.

18. The system of claim 15 further comprising, a gear ring that is operatively coupled to the lever, such that a pivoting of the lever causes the gear ring to rotate.

19. The system of claim 18 further comprising a control ring that is axially adjacent to the gear ring, wherein rotation of the gear ring engages the control ring to axially shift the control ring.

20. The system of claim 19, wherein the control ring and the gear ring include respective protruding elements that axially align to bias the control ring away from the gear ring.

* * * * *